(12) United States Patent
Chen et al.

(10) Patent No.: US 11,870,207 B1
(45) Date of Patent: Jan. 9, 2024

(54) LASER DEVICE

(71) Applicant: Changchun Institute of Optics, Fine Mechanics and Physics, Chinese Academy of Sciences, Changchun (CN)

(72) Inventors: Fei Chen, Changchun (CN); Yi Chen, Changchun (CN); Junjie Sun, Changchun (CN); Jinghua Yu, Changchun (CN); Zhihuan Yao, Changchun (CN); Yang He, Changchun (CN); Kuo Zhang, Changchun (CN); Deyang Yu, Changchun (CN)

(73) Assignee: Changchun Institute of Optics, Fine Mechanics and Physics, Chinese Academy of Sciences, Changchun (CN)

( * ) Notice: Subject to any disclaimer, the term of this patent is extended or adjusted under 35 U.S.C. 154(b) by 0 days.

(21) Appl. No.: 18/366,537

(22) Filed: Aug. 7, 2023

(30) Foreign Application Priority Data

Oct. 20, 2022 (CN) .......................... 202211283070.3

(51) Int. Cl.
*H01S 3/08* (2023.01)
*H01S 3/081* (2006.01)
*H01S 3/16* (2006.01)

(52) U.S. Cl.
CPC .......... *H01S 3/0815* (2013.01); *H01S 3/0811* (2013.01); *H01S 3/08059* (2013.01); *H01S 3/1643* (2013.01); *H01S 3/1698* (2013.01)

(58) Field of Classification Search
CPC ...... H01S 3/08; H01S 3/08059; H01S 3/0815; H01S 3/0813; H01S 3/081; H01S 3/0816; H01S 3/083
See application file for complete search history.

(56) References Cited

U.S. PATENT DOCUMENTS

| | | | | |
|---|---|---|---|---|
| 5,148,443 A | * | 9/1992 | Du | H01S 3/08059 372/99 |
| 6,901,102 B1 | * | 5/2005 | Yanagisawa | H01S 3/08059 372/98 |
| 7,289,548 B2 | * | 10/2007 | Ishizu | H01S 3/083 372/100 |

FOREIGN PATENT DOCUMENTS

CN 110600979 * 12/2019 ........... H01S 3/0813

* cited by examiner

*Primary Examiner* — Xinning(Tom) Niu
*Assistant Examiner* — Delma R Fordé
(74) *Attorney, Agent, or Firm* — Westbridge IP LLC

(57) ABSTRACT

A laser device includes a gain medium, a zero-degree reflective mirror, a first retro-reflective mirror, a second retro-reflective mirror, and an output coupling mirror. The gain medium is used to generate radiation light; the zero-degree reflective mirror has a common optical axis with the gain medium, and the zero-degree reflective mirror is used to totally reflect second-direction radiation light that is incident on the zero-degree reflective mirror in an optical-axis direction; the first-direction radiation light and the first emitted light are spaced from and parallel to each other in opposite directions; the first emitted light and the second emitted light are spaced from and parallel to each other in opposite directions; a resonant cavity is formed between the zero-degree reflective mirror and the output coupling mirror; the output coupling mirror is used to transmit and output first partial radiation light, and reflect second partial radiation light.

10 Claims, 2 Drawing Sheets

LASER DEVICE

CROSS-REFERENCE TO RELATED APPLICATIONS

This application claims priority to Chinese Patent Application No. 202211283070.3, filed on Oct. 20, 2022, the content of which is incorporated herein by reference in its entirety.

TECHNICAL FIELD

The present disclosure relates to a field of laser technology, in particular to a laser device.

BACKGROUND

Laser has characteristics such as high brightness, concentrated direction, and high energy. In recent years, laser has been gradually applied in various technical fields, such as material processing, surveying and mapping, imaging and other technical fields. In fields of lighting and imaging technologies, the characteristics of laser in terms of direction and brightness may be fully utilized. Lighting and imaging regions may be effectively controlled within a predetermined range, with a highly stable light brightness and a strong anti-interference ability.

A high-energy solid-state laser device requires a large cavity length to achieve a large size of fundamental transverse mode. However, with the large cavity length, the laser device may be sensitive to a deformation of an optical element. An environmental temperature difference, a vibration, an impact, etc. may directly act on a housing of the laser device, and a stress, a temperature difference, etc. may be transmitted to an optical base plate of the laser device and cause a deformation of the optical base plate. The deformation of the optical base plate may further lead to a change in pitch and yaw angles of an optical component such as a mirror frame, and then cause a decrease in an output power of the laser device or even an output failure.

SUMMARY

In order to solve the above-mentioned problems, the present disclosure provides a laser device with a novel structure, which includes a gain medium, a zero-degree reflective mirror, a first retro-reflective mirror, a second retro-reflective mirror, and an output coupling mirror;

the gain medium is located between the first retro-reflective mirror and the second retro-reflective mirror, and is configured to generate radiation light; the zero-degree reflective mirror has a common optical axis with the gain medium; the radiation light includes first-direction radiation light and second-direction radiation light; the first-direction radiation light is configured to be incident on the first retro-reflective mirror; the second-direction radiation light is configured to be incident on the zero-degree reflective mirror, totally reflected by the zero-degree reflective mirror, incident on the gain medium, and incident on the first retro-reflective mirror to form incident light together with the first-direction radiation light;

the first retro-reflective mirror and the zero-degree reflective mirror are located on opposite sides of the gain medium, and the first retro-reflective mirror is arranged in a vertical direction; the incident light is configured to be incident on the first retro-reflective mirror, and emitted after passing through the first retro-reflective mirror, so as to obtain first emitted light; a direction of the incident light is opposite to a direction of the first emitted light, and the incident light and the first emitted light are parallel to each other and spaced from each other in the vertical direction;

the second retro-reflective mirror and the zero-degree reflective mirror are located on the same side of the gain medium, and the second retro-reflective mirror is arranged in the vertical direction; the first emitted light is configured to be incident on the second retro-reflective mirror, and emitted after passing through the second retro-reflective mirror, so as to obtain second emitted light; a direction of the second emitted light is opposite to the direction of the first emitted light, and the first emitted light and the second emitted light are parallel to each other and spaced from each other in the vertical direction; and a resonant cavity is formed between the zero-degree reflective mirror and the output coupling mirror; the second emitted light is configured to be incident on the output coupling mirror; the output coupling mirror is configured to transmit and output first partial radiation light, and reflect second partial radiation light.

Preferably, the first retro-reflective mirror includes a first reflective surface and a second reflective surface that are arranged perpendicular to each other; the first reflective surface is arranged opposite to one end of the gain medium, so that the incident light is transmitted between the first reflective surface and the gain medium.

Preferably, the second retro-reflective mirror includes a third reflective surface and a fourth reflective surface that are arranged perpendicular to each other;

the third reflective surface is arranged opposite to the second reflective surface, so that the first emitted light is transmitted between the third reflective surface and the second reflective surface;

the fourth reflective surface is arranged opposite to the output coupling mirror, so that the second emitted light is transmitted between the fourth reflective surface and the output coupling mirror.

Preferably, the first retro-reflective mirror and/or the second retro-reflective mirror include a right-angle prism.

Preferably, the first retro-reflective mirror and/or the second retro-reflective mirror include two 45-degree reflective mirrors perpendicular to each other.

Preferably, the laser device further includes a modulator arranged between the output coupling mirror and the second retro-reflective mirror, and the modulator is configured to adjust a light emitting direction of the second emitted light.

Preferably, the modulator includes an electro-optic modulator and/or an acousto-optic modulator.

Preferably, the laser device further includes a pumping light source, and the pumping light source is configured to provide pumping light, so that the pumping light passes through the zero-degree reflective mirror and is absorbed by the gain medium.

Preferably, the gain medium is made of Yb:YAG, and a doping concentration of the gain medium ranges from 7% to 20%.

Preferably, the radiation light generated by the gain medium has a wavelength of 1030 nm, and a ratio of the first partial radiation light to the first-direction radiation light ranges from 1% to 50%.

With a combined use of the first retro-reflective mirror and the second retro-reflective mirror, the laser device of the present disclosure may achieve a stable optical path in the resonant cavity, the tolerance of the laser device to the deformation of the optical base plate may be improved, and then the tolerance of the high-energy laser device to a complex environmental condition may be improved. Moreover, the laser device of the present disclosure may passively compensate the deformation of the optical base plate caused by a change in an environmental parameter, thereby improving the environmental adaptability of the laser device while ensuring a stable laser output with high energy and good beam quality.

DETAILED DESCRIPTION OF THE EMBODIMENTS

In order to make objectives, technical solutions and advantages of the present disclosure clearer, the present disclosure will be further described in detail below in conjunction with the accompanying drawings and specific embodiments. It should be understood that the specific embodiments described here are only used to explain the present disclosure, but do not constitute a limitation to the present disclosure.

It should be understood that, although the terms "first," "second", "third" and so on may be used for descriptions in the specific embodiments of the present disclosure, those descriptions should not be limited by those terms. Those terms are merely used to distinguish. For example, without departing from the scope of the specific embodiments of the present disclosure, "first" may also be named as "second", and similarly, "second" may also be named as "first".

Figure 1:
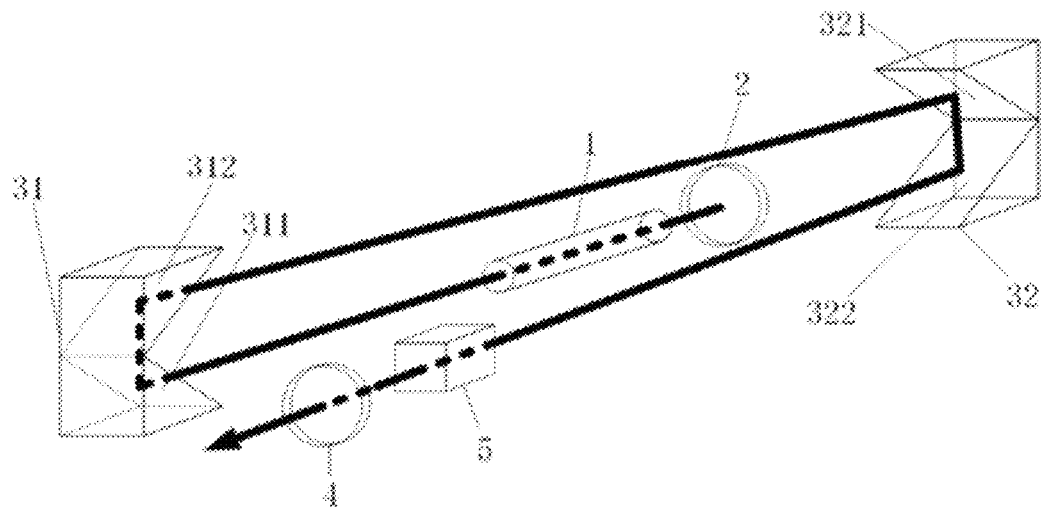
FIG. 1 shows a schematic structural diagram of a laser device provided by a first specific embodiment of the present disclosure.

As shown in FIG. 1, in a first specific embodiment of the present disclosure, a laser device with a novel structure is provided. The laser device 10 includes a gain medium 1, a zero-degree reflective mirror 2, a first retro-reflective mirror 31, a second retro-reflective mirror 32, and an output coupling mirror 4.

The gain medium 1 is located between the first retro-reflective mirror 31 and the second retro-reflective mirror 32, and is used to generate radiation light. The radiation light includes first-direction radiation light and second-direction radiation light. The first-direction radiation light is incident on the first retro-reflective mirror 31. The second-direction radiation light is incident on the zero-degree reflective mirror 2. After being totally reflected by the zero-degree reflective mirror 2, the second-direction radiation light is incident on the gain medium 1 and then incident on the first retro-reflective mirror 31 to form incident light together with the first-direction radiation light.

The first retro-reflective mirror 31 and the zero-degree reflective mirror 2 are located on opposite sides of the gain medium 1. The incident light is incident on the first retro-reflective mirror 31. After passing through the first retro-reflective mirror 2, the incident light is emitted to obtain first emitted light. A direction of the first emitted light is opposite to a direction of the incident light, and the first emitted light is spaced from and parallel to the incident light.

The second retro-reflective mirror 32 and the zero-degree reflective mirror 2 are located on the same side of the gain medium 1. The first emitted light is incident on the second retro-reflective mirror 32. After passing through the second retro-reflective mirror 32, the first emitted light is emitted to obtain second emitted light. A direction of the second emitted light is opposite to the direction of the first emitted light, and the second emitted light is spaced from and parallel to the first emitted light.

A resonant cavity is formed between the zero-degree reflective mirror 2 and the output coupling mirror 4. The second emitted light is incident on the output coupling mirror 4. The output coupling mirror 4 is used to transmit and output first partial radiation light, and reflect second partial radiation light.

In this specific embodiment, the incident light in an optical-axis direction of the gain medium 1 travels back and forth multiple times between the zero-degree mirror 2 and the output coupling mirror 4. Specifically, the second-direction radiation light along the optical axis generated by the gain medium 1 is totally reflected by the zero-degree reflective mirror 2, passes through the gain medium 1, and forms incident light together with the first-direction radiation light. The incident light is transmitted in a reverse direction through the first retro-reflective mirror 31, then transmitted in a reverse direction through the second retro-reflective mirror 32, and reaches the output coupling mirror 4. The output coupling mirror 4 may transmit and output the first partial radiation light, and reflect the second partial radiation light. The reflected second partial radiation light returns along an original optical path, passes through the second retro-reflective mirror 32, the first retro-reflective mirror 31 and the gain medium 1, and reaches the zero-degree reflective mirror 2. The radiation light travels back and forth multiple times between the zero-degree reflective mirror 2 and the output coupling mirror 4 to form laser, and the laser may be output from the output coupling mirror 4.

In this specific embodiment, the gain medium 1 is used to generate radiation light and may be, for example, in a shape of a long strip. A central axis of the gain medium 1 may be an optical axis of the gain medium 1. The gain medium 1 may be made of various common materials such as Yb:YVO4, Nd:YAG, etc. Taking Yb:YAG material as an example, a doping concentration may range from 7% to 20%, a diameter of the gain medium 1 may be greater than or equal to 1 mm, and a length of the gain medium 1 may be greater than or equal to 1 mm, such as 20 mm. The gain medium 1 may also absorb pumping light and provide a gain for the radiation light. The zero-degree reflective mirror 2 may be a plane reflective mirror, with an optical axis perpendicular to the zero-degree reflective mirror 2. A diameter of the zero-degree reflective mirror 2 may be greater than or equal to 10 mm. Preferably, the diameter of the zero-degree reflective mirror 2 is greater than the diameter of the gain medium 1. The zero-degree reflective mirror 2 is coated with a 0-degree laser high-reflection film. Accordingly, the radiation light generated by the gain medium 1 has a wavelength of 1030 nm. A ratio of the first partial radiation light to the incident light ranges from 1% to 50%, that is, a proportion of the first partial radiation light transmitted and output by the output coupling mirror ranges from 1% to 50%.

In this specific embodiment, the first retro-reflective mirror 31 includes a first reflective surface 311 and a second reflective surface 312 that are arranged perpendicular to each other. The gain medium 1 includes a first end portion and a second end portion, the first end portion is an end portion of the gain medium 1 close to the first retro-reflective mirror 31, and the second end portion is an end portion of the gain medium 1 close to the zero-degree reflective mirror 2. The first reflective surface 311 is arranged opposite to the first end portion of the gain medium 1, so that the incident light is transmitted between the first reflective surface 311 and the gain medium 1. By adopting such structure, the incident light incident on the first reflective surface 311 may be reflected by the first reflective surface 311 toward the second reflective surface 312, and then the light is reflected out by the second reflective surface 312. An optical path of the first-direction radiation light incident on the first reflective surface 311 is spaced from and parallel to an optical path of the first emitted light reflected from the second reflective surface 312, and the two have opposite transmission directions.

In this specific embodiment, the second retro-reflective mirror 32 includes a third reflective surface 321 and a fourth reflective surface 322 that are arranged perpendicular to each other. The third reflective surface 321 is arranged opposite to the second reflective surface 312, so that the first emitted light is transmitted between the third reflective surface 321 and the second reflective surface 312. The fourth reflective surface 322 is arranged opposite to the output coupling mirror 4, so that the second emitted light is transmitted between the fourth reflective surface 322 and the output coupling mirror 4. By adopting such structure, the first emitted light incident on the third reflective surface 321 may be reflected by the third reflective surface 321 toward the fourth reflective surface 321, and then reflected out by the fourth reflective surface 322. An optical path of the first emitted light incident on the third reflective surface 321 is spaced from and parallel to an optical path of the second emitted light reflected by the fourth reflective surface 322, and the two have opposite transmission directions.

Figure 2A:
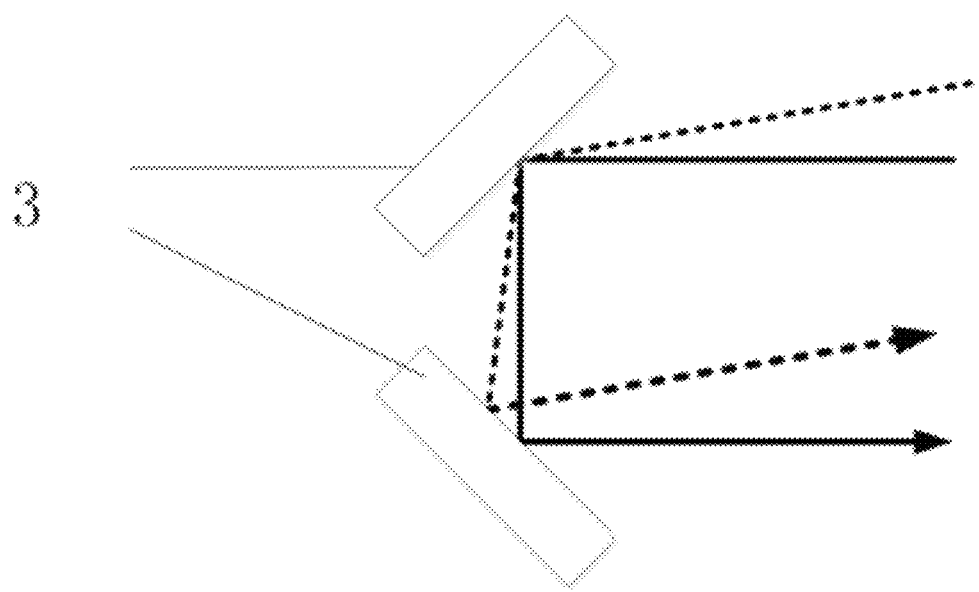
FIG. 2a shows a schematic diagram of an operating principle of a retro-reflective mirror provided by the specific embodiments of the present disclosure.
Figure 2B:
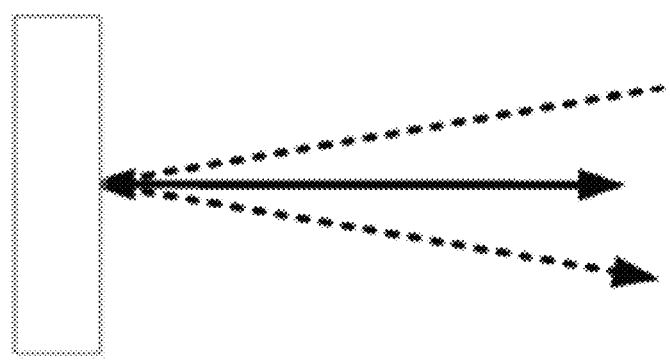
FIG. 2b shows a schematic diagram of an operating principle of an ordinary plane mirror provided in a related art.

In this specific embodiment, FIG. 2*a* shows an operating principle of a retro-reflective mirror, and FIG. 2*b* shows an operating principle of an ordinary plane mirror. Specifically, referring to FIG. 2*b*, for the ordinary plane mirror, only when an incident angle is 0 degrees, that is, when the incident light is incident perpendicular to the reflective surface, the incident light and the reflected light may be parallel to each other, as shown by the light indicated by solid lines. When the optical base plate of the laser device is deformed due to an influence of an external environmental change, the incident light incident on the reflective mirror in the laser optical path may be inclined, or the reflective mirror may be inclined. In this case, an included angle may be formed between the incident light incident on the reflective mirror and the reflected light emitted from the reflective mirror, as shown by the light indicated by dotted lines. In a laser resonant cavity, every time the light passes through the reflective mirror, an inclination angle of the light may be enlarged, which causes the light to overflow from the resonant cavity, and thus result in a decrease in the output power of the laser device or even an output failure.

In the laser device provided by the specific embodiments of the present disclosure, two retro-reflective mirrors are used, and the operating principle of the retro-reflective mirror is as described in FIG. 2*a*. For the retro-reflective mirror 3, the two reflective surfaces are always kept perpendicular to each other, so that the incident light incident on the retro-reflective mirror 3 and the reflected light emitted from the retro-reflective mirror 3 are always spaced from and parallel to each other in opposite directions, as shown by the optical paths indicated by the solid lines and the dotted lines.

In the present disclosure, by providing the retro-reflective mirror instead of the ordinary plane reflective mirror in the laser device, it is possible to achieve a passive supplement to the incident light to ensure that the emitted light is parallel to the incident light, so that the optical path in the resonant cavity of the laser device is stable and a tolerance of the laser device to the deformation of the optical base plate is improved, that is, a tolerance of a high-energy laser device to a complex environmental condition is improved. The laser device provided with the retro-reflective mirror may passively compensate the deformation of the optical base plate caused by a change in an environmental parameter, thereby improving an environmental adaptability of the laser device while ensuring a stable laser output with high energy and good beam quality.

Figure 3:
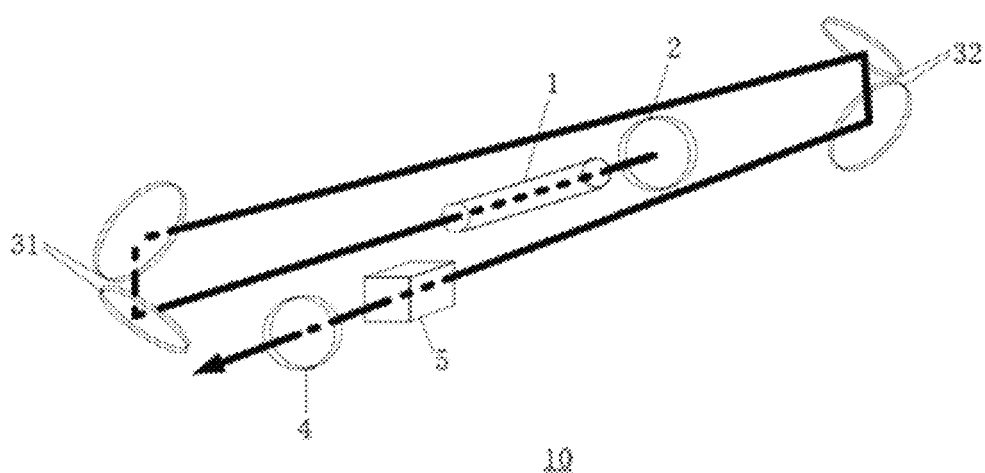
FIG. 3 shows a schematic structural diagram of a laser device provided by a second specific embodiment of the present disclosure.

In a specific embodiment, a material of the retro-reflective mirror 3 may include fused silica, K9 glass, or copper, or aluminum alloy, or stainless steel. In such specific embodiment, the first retro-reflective mirror 31 and/or the second retro-reflective mirror 32 include a right-angle prism. As shown in FIG. 3, in the second specific embodiment, the first retro-reflective mirror 31 and/or the second retro-reflective mirror 32 include two 45-degree reflective mirrors perpendicular to each other. When two 45-degree reflective mirrors perpendicular to each other are used, the reflective surfaces are all coated with a 45-degree high-reflection film. The retro-reflective mirror is formed by bonding two separate portions, or may be directly manufactured as a whole. The two reflective surfaces of the retro-reflective mirror are at a 90-degree angle, so that the incident laser may be returned in parallel and a particular distance is formed between the incident light and the reflected light.

As shown in FIG. 1 and FIG. 3, in a specific embodiment, the laser device 10 further includes a modulator 5, which is arranged between the output coupling mirror 4 and the second retro-reflective mirror 32. The modulator 5 is used to adjust a light emitting direction of the second emitted light. The modulator 5 may include an electro-optic modulator and/or an acousto-optic modulator.

In a specific embodiment, the laser device 10 may further include a pumping light source, which may be arranged on a side of the zero-degree reflective mirror 2 away from the gain medium 1. The pumping light source is used to provide pumping light. The pumping light may pass through the zero-degree reflective mirror and may be absorbed by the gain medium. A wavelength of the pumping light may be 940 nm or 969 nm.

As shown in FIG. 1 to FIG. 3, the operating principle of the laser device 10 provided by the specific embodiments of the present disclosure is as follows. The pumping light emitted by the pumping light source has a wavelength of 940 nm or 969 nm, and may be continuous light or quasi-continuous light. The pumping light passes through the zero-degree reflective mirror 2 and is absorbed by the gain medium 1. The gain medium 1 emits radiation light with a wavelength of 1030 nm through an effect of spontaneous emission. The radiation light includes first-direction radiation light and second-direction radiation light. The second-direction radiation light is incident on the zero-degree reflective mirror 2. After being totally reflected by the zero-degree reflective mirror 2, the second-direction radiation light is incident on the gain medium 1 and then incident on the first retro-reflective mirror 31 to form incident light together with the first-direction radiation light. The incident light transmitted in the optical-axis direction of the gain medium 1 is incident on the first retro-reflective mirror 31, and is reflected by the first retro-reflective mirror 31 to the second retro-reflective mirror 32. After being reflected by the second retro-reflective mirror 32, the incident light continues to be incident on the modulator 5. When a laser output is not required, the modulator 5 diffracts the incident light out of the cavity, which means that a loss in the cavity is high and the radiation light may fail to pass through the modulator 5. When a laser output is required, the modulator 5 does not apply diffraction to the incident light, and the incident light passes through the modulator 5 and is incident on the output coupling mirror 4. At this time, the optical path is divided into two parts, where the first partial radiation light is output from the output coupling mirror 4, and the remaining second partial radiation light is reflected by the output coupling mirror 4 and returns along an original path. After the second partial radiation light that returns along the original path is incident on the gain medium 1 again, the radiation light is amplified under an action of stimulated radiation, that is, stimulated and amplified radiation light forms laser. The laser is incident on the zero-degree reflective mirror 2, reflected by the zero-degree reflective mirror 2, and returns along the original path. The laser travels set and forth multiple times between the zero-degree reflective mirror 2 and the output coupling mirror 4. During a round-trip process, the laser is continuously output from the output coupling mirror 4.

With a combined use of the first retro-reflective mirror and the second retro-reflective mirror, the laser device of the present disclosure may achieve a stable optical path in the resonant cavity, the tolerance of the laser device to the deformation of the optical base plate may be improved, and then the tolerance of the high-energy laser device to a complex environmental condition may be improved. Moreover, the laser device of the present disclosure may passively compensate the deformation of the optical base plate caused by a change in an environmental parameter, thereby improving the environmental adaptability of the laser device while ensuring a stable laser output with high energy and good beam quality.

Although the embodiments of the present disclosure have been illustrated and described above, it should be understood that the above embodiments are exemplary and should not be construed as limiting the present disclosure. Those ordinary skilled in the art may make changes, modifications, substitutions and transformations on the above embodiments within the scope of the present disclosure.

The above specific embodiments of the present disclosure do not constitute a limitation to the protection scope of the present disclosure. Any other corresponding changes and modifications made according to the technical concept of the present disclosure shall be contained in the protection scope of the claims of the present disclosure.

What is claimed is:

1. A laser device, comprising a gain medium, a zero-degree reflective mirror, a first retro-reflective mirror, a second retro-reflective mirror, and an output coupling mirror;
    wherein the gain medium is located between the first retro-reflective mirror and the second retro-reflective mirror, and is configured to generate radiation light; the zero-degree reflective mirror has a common optical axis with the gain medium; the radiation light comprises first-direction radiation light and second-direction radiation light; the first-direction radiation light is configured to be incident on the first retro-reflective mirror; the second-direction radiation light is configured to be incident on the zero-degree reflective mirror, totally reflected by the zero-degree reflective mirror, incident on the gain medium, and incident on the first retro-reflective mirror to form incident light together with the first-direction radiation light;
    wherein the first retro-reflective mirror and the zero-degree reflective mirror are located on opposite sides of the gain medium, and the first retro-reflective mirror is arranged in a vertical direction; the incident light is configured to be incident on the first retro-reflective mirror, and emitted after passing through the first retro-reflective mirror, so as to obtain first emitted light; a direction of the incident light is opposite to a direction of the first emitted light, and the incident light and the first emitted light are parallel to each other and spaced from each other in the vertical direction;
    wherein the second retro-reflective mirror and the zero-degree reflective mirror are located on the same side of the gain medium, and the second retro-reflective mirror is arranged in the vertical direction; the first emitted light is configured to be incident on the second retro-reflective mirror, and emitted after passing through the second retro-reflective mirror, so as to obtain second emitted light; a direction of the second emitted light is opposite to the direction of the first emitted light, and the first emitted light and the second emitted light are parallel to each other and spaced from each other in the vertical direction; and
    wherein a resonant cavity is formed between the zero-degree reflective mirror and the output coupling mirror; the second emitted light is configured to be incident on the output coupling mirror; the output coupling mirror is configured to transmit and output first partial radiation light, and reflect second partial radiation light; the first retro-reflective mirror and the second retro-reflective mirror are configured to be used in cooperation, so that the laser device passively supplements a deformation of an optical base plate caused by a change in an environmental parameter.

2. The laser device according to claim 1, wherein the first retro-reflective mirror comprises a first reflective surface and a second reflective surface that are arranged perpendicular to each other; and
    wherein the first reflective surface is arranged opposite to one end of the gain medium, so that the incident light is transmitted between the first reflective surface and the gain medium.

3. The laser device according to claim 2, wherein the second retro-reflective mirror comprises a third reflective surface and a fourth reflective surface that are arranged perpendicular to each other; and
    wherein the third reflective surface is arranged opposite to the second reflective surface, so that the first emitted light is transmitted between the third reflective surface and the second reflective surface; and
    wherein the fourth reflective surface is arranged opposite to the output coupling mirror, so that the second emitted light is transmitted between the fourth reflective surface and the output coupling mirror.

4. The laser device according to claim 1, wherein the first retro-reflective mirror and/or the second retro-reflective mirror comprise a right-angle prism.

5. The laser device according to claim 1, wherein the first retro-reflective mirror and/or the second retro-reflective mirror comprise two 45-degree reflective mirrors perpendicular to each other.

6. The laser device according to claim 1, further comprising a modulator arranged between the output coupling mirror and the second retro-reflective mirror, wherein the modulator is configured to adjust a light emitting direction of the second emitted light.

7. The laser device according to claim 6, wherein the modulator comprises an electro-optic modulator and/or an acousto-optic modulator.

8. The laser device according to claim 1, further comprising a pumping light source, wherein the pumping light source is configured to provide pumping light, so that the pumping light passes through the zero-degree reflective mirror and is absorbed by the gain medium.

9. The laser device according to claim 1, wherein the gain medium is made of Yb:YAG, and a doping concentration of the gain medium ranges from 7% to 20%.

10. The laser device according to claim 9, wherein the radiation light generated by the gain medium has a wavelength of 1030 nm, and a ratio of the first partial radiation light to the first-direction radiation light ranges from 1% to 50%.

* * * * *